(12) United States Patent
Leisenheimer et al.

(10) Patent No.: US 12,339,695 B2
(45) Date of Patent: Jun. 24, 2025

(54) STRAY FIELD ROBUST MAGNETIC SENSOR SYSTEM FOR DETECTING A STATE OF A TILTABLE AND ROTATABLE OBJECT

(71) Applicant: Infineon Technologies AG, Neubiberg (DE)

(72) Inventors: Stephan Leisenheimer, Oberhaching (DE); Richard Heinz, Munich (DE); Severin Neuner, Valley (DE); Michael Ortner, Villach (AT); Peter Leitner, Graz (AT); Florian Slanovc, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 50 days.

(21) Appl. No.: 18/357,496

(22) Filed: Jul. 24, 2023

(65) Prior Publication Data

US 2025/0036156 A1   Jan. 30, 2025

(51) Int. Cl.
*G05G 9/047* (2006.01)
*G06F 3/0338* (2013.01)

(52) U.S. Cl.
CPC .......... *G05G 9/047* (2013.01); *G06F 3/0338* (2013.01); *G05G 2009/04707* (2013.01); *G05G 2009/04755* (2013.01)

(58) Field of Classification Search
CPC .......... G05G 9/047; G05G 2009/04755; G06F 3/0338
See application file for complete search history.

(56) References Cited

U.S. PATENT DOCUMENTS

| | | |
|---|---|---|
| 10,048,091 B1 | 8/2018 | Ortner |
| 2021/0048320 A1 | 2/2021 | Marauska et al. |
| 2022/0187054 A1 | 6/2022 | Park et al. |
| 2022/0276072 A1* | 9/2022 | Dupre ..................... G01D 3/036 |
| 2023/0184565 A1* | 6/2023 | Yoshiya ................. G01D 5/147 |
| | | 324/207.2 |
| 2023/0213358 A1* | 7/2023 | Tombez ............. G01D 5/24461 |
| | | 324/207.2 |

* cited by examiner

*Primary Examiner* — Pegeman Karimi
(74) *Attorney, Agent, or Firm* — Harrity & Harrity, LLP

(57) ABSTRACT

A sensor system may include an object, a magnet, and a magnetic sensor. The magnet may be connected to the object such that a center of the magnet is offset from an axis of the object. The magnetic sensor may include a first three-dimensional (3D) sensing pixel and a second 3D sensing pixel. The magnetic sensor may be arranged such that the first 3D sensing pixel and the second 3D sensing pixel are at different distances from a tilt point of the object. The magnetic sensor may be arranged such that the first 3D sensing pixel and the second 3D sensing pixel are at different distances from the center of the magnet.

26 Claims, 4 Drawing Sheets

STRAY FIELD ROBUST MAGNETIC SENSOR SYSTEM FOR DETECTING A STATE OF A TILTABLE AND ROTATABLE OBJECT

BACKGROUND

A magnetic sensor may be capable of sensing multiple (e.g., perpendicular) components of a magnetic field in an environment of the magnetic sensor (e.g., an x-component, a y-component, and a z-component). The magnetic sensor may be used to detect, for example, movement, a linear position, an angular position, a position in three-dimensional (3D) space, or the like, of a magnet that is affixed to an object. A magnetic sensor can be used in a variety of applications, such as an automotive application, an industrial application, or a consumer application, among other examples.

SUMMARY

In some implementations, a sensor system includes an object; a magnet connected to the object, the magnet being connected to the object such that a center of the magnet is offset from an axis of the object; and a magnetic sensor comprising a first 3D sensing pixel and a second 3D sensing pixel, wherein the magnetic sensor is arranged such that the first 3D sensing pixel and the second 3D sensing pixel are at different distances from a tilt point of the object, and wherein the magnetic sensor is arranged such that the first 3D sensing pixel and the second 3D sensing pixel are at different distances from the center of the magnet.

In some implementations, a sensor system includes a magnet connected to an object, the magnet being connected to the object such that the magnet is not centered on an axis of the object; and a differential 3D sensor, wherein a first 3D sensing pixel of the differential 3D sensor and a second 3D sensing pixel of the differential 3D sensor are at different distances from a tilt point of the object, and wherein the differential 3D sensor is not centered with respect to a center of the magnet.

In some implementations, an apparatus includes a magnet connected to an object capable of being positioned with respect to multiple degrees of freedom, wherein the magnet is connected to the object such that a center of the magnet is offset from an axis of the object; and a magnetic sensor to determine a state of the object with respect to the multiple degrees of freedom based on a set of magnetic field strengths of a magnetic field generated by the magnet, the magnetic sensor comprising a first 3D sensing pixel and a second 3D sensing pixel, wherein a distance between the first 3D sensing pixel and a tilt point of the object is different from a distance between the second 3D sensing pixel and the tilt point of the object, and wherein a distance between the first 3D sensing pixel and the center of the magnet is different from a distance between the second 3D sensing pixel and the center of the magnet.

DETAILED DESCRIPTION

Figure 1A:
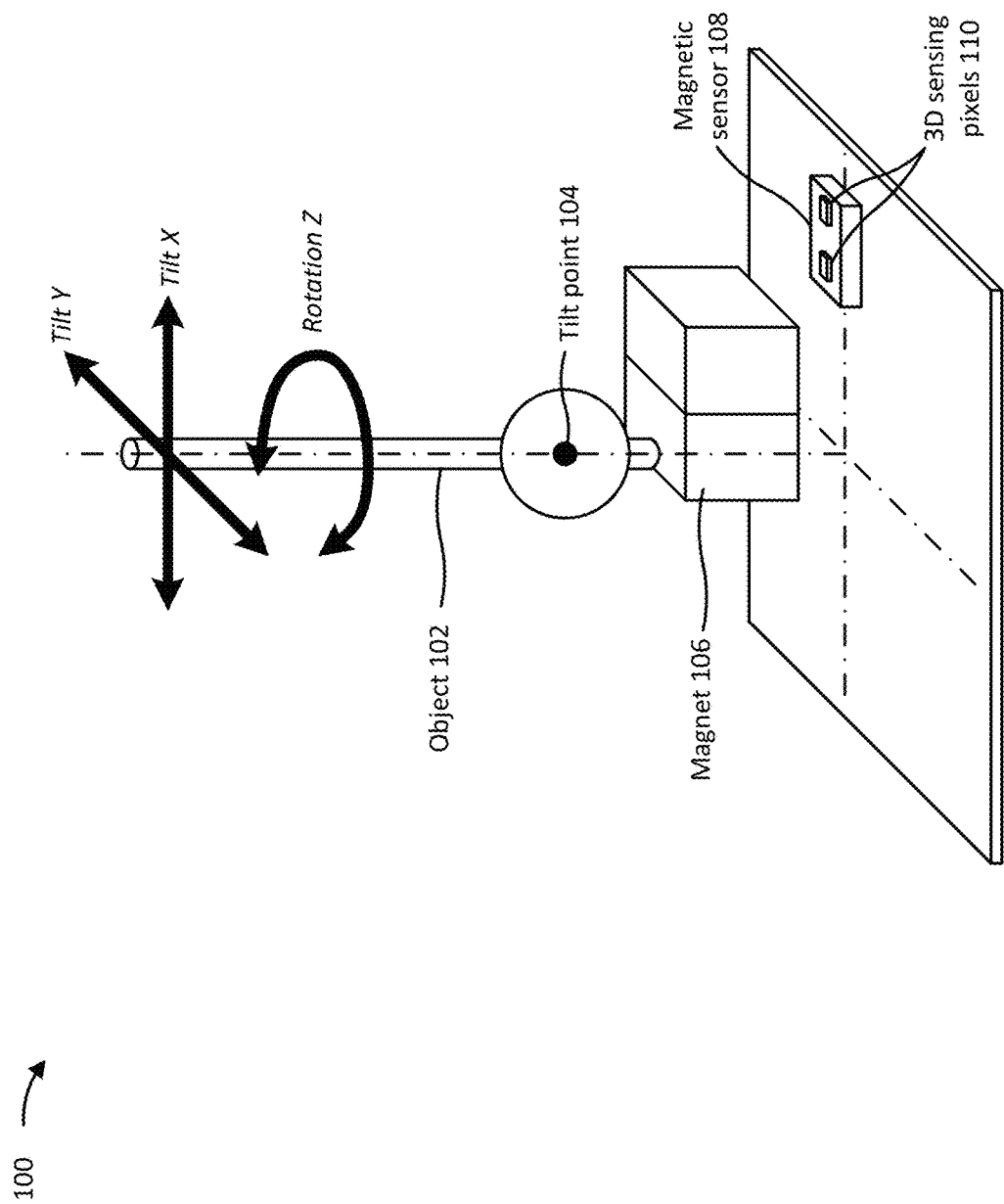
FIGS. 1A and 1B are diagrams of example implementations of a stray field robust sensor system that can be used for detecting a state of a tiltable and rotatable object, as described herein.

The following detailed description of example implementations refers to the accompanying drawings. The same reference numbers in different drawings may identify the same or similar elements.

An object may be capable of three degrees of freedom (3DoF) motion in a given application. For example, the object may be capable of tilting with respect to a first tilt direction (e.g., an x-direction), tilting with respect to a second tilt direction (e.g., a y-direction) and rotating with respect to an axis of the object (e.g., an axis in a z-direction when the object is in an un-tilted position). The tilt with respect to the first tilt direction, the tilt with respect to the second tilt direction, and the rotation with respect to the axis of the object may be collectively referred to as a "state" of the object. The object may be, for example, a joystick (e.g., used in a gaming application, a nautical application, an aerospace application, or the like) or a ball joint (e.g., used in a robotic device, a mechanical application, a multimedia control element, or the like), among other examples. The state of the object at a given point in time may therefore be of interest in a given application.

In some such applications, multiple-sensor systems (sometimes using different sensing principles) may be implemented in order to detect the state of the object. For example, a system may comprise three potentiometers configured to detect the state of the object. However, such a multiple potentiometer system suffers from low reliability and increases cost and complexity. As another example, an optical sensor system (e.g., a pair of optical sensor systems including photodiodes, light guides, light emitting diodes, and/or the like) may be used to detect the tilt of the object with respect to the first direction and the second direction, and an incremental optical encoder sensor system may be used to detect the rotational position of the object. However, such a multiple optical-sensor system comes with a substantial cost and/or complexity increase. As another example, a sensor system may comprise two magnetic sensors-a first magnetic sensor configured to detect tilt with respect to a first direction and the second direction, and a second magnetic sensor configured to detect a rotational position. However, such a multiple magnetic sensor system increases cost and complexity, and introduces complex mechanics. Furthermore, such a multiple magnetic sensor system is not stray field robust, meaning that reliability of the multiple magnetic sensor is reduced.

Some implementations described herein provide techniques and apparatuses for a stray field robust magnetic sensor system that can be used for detecting a state of a tiltable and rotatable object. In some implementations, the sensor system includes an object and a magnet connected to the object, with the magnet being connected to the object such that a center of the magnet is offset from an axis of the object. The sensing system further includes a magnetic sensor comprising a first 3D sensing pixel and a second 3D sensing pixel. Here, the magnetic sensor is arranged such that the first 3D sensing pixel and the second 3D sensing pixel are at different distances from a tilt point of the object, and such that the first 3D sensing pixel and the second 3D sensing pixel are at different distances from the center of the magnet.

Here, since only a single magnetic sensor and a single magnet are needed, the sensor system has a reduced complexity and/or a reduced cost (e.g., as compared to an implementation that uses multiple sensor systems to detect the state of the object). Moreover, due to the use of magnetic sensing principles, the sensor system described herein has an increased lifetime (e.g., due to contact-free, and thus wear-free, operation), an increased potential for miniaturization, and an increased robustness against, for example, temperature variation and dirt. Furthermore, the pair of 3D sensing pixels enable differential 3D sensing, meaning that the sensor system is robust against stray fields in an environment of the sensor system and, further, that a need for system calibration is reduced or eliminated, which reduces production effort and cost. Additional details are provided below.

Figure 1B:
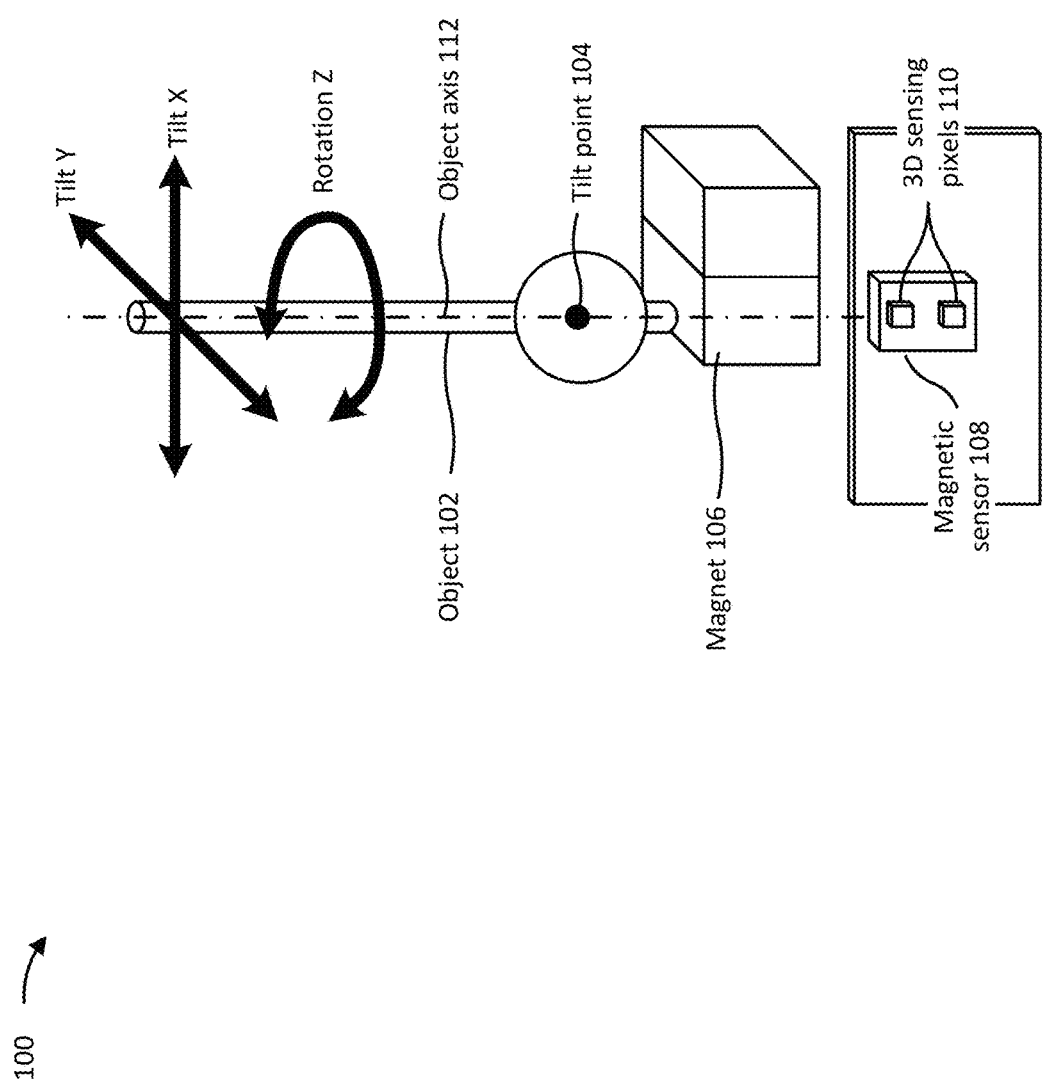

FIGS. 1A and 1B are diagrams of example implementations of a stray field robust sensor system 100 that can be used for detecting a state of a tiltable and rotatable object, as described herein. As shown in FIGS. 1A and 1B, the sensor system 100 may in some implementations include an object 102 capable of tilting about a tilt point 104, a magnet 106, and a magnetic sensor 108 comprising a pair of 3D sensing pixels 110.

Object 102 includes an object for which a state (e.g., a tilt position, a rotational position, and/or the like) is of interest for a given application. For example, the object 102 may include or be included in a joystick (e.g., a three-axis joystick), such as a gaming joystick, a nautical joystick (e.g., used for motorboat steering), or an aerospace joystick (e.g., used for flight control of an airplane), among other examples. As another example, the object 102 may include a device capable of 3DoF motion, such as a robotic joint (e.g., a shoulder, a neck, a wrist, or the like), a mechanical joint (e.g., used in a steering knuckle, an automotive suspension system, or the like), or a control element (e.g., a knob, a dial, a wheel, a button, or any combination thereof), among other examples. In some implementations, the object 102 may be included in, for example, a vehicle for use in controlling a system (e.g., a multimedia system, a navigation system, an audio system, a telephone system, and/or the like). In some implementations, the object 102 is connected to (e.g., attached to, coupled with, affixed to, embedded in, or the like) the magnet 106.

In some implementations, object 102 is capable of tilting (e.g., about tilt point 104) with respect to a first direction (e.g., an x-direction) and a second direction (e.g., a direction that is substantially perpendicular to the x-direction, such as a y-direction) such that object 102 may be in multiple tilt positions. If the object 102 is not tilted with respect to the x-direction or the y-direction, then object 102 may be said to be in an un-tilted position. In some implementations, object 102 is capable of being positioned in multiple tilt positions in a given direction (e.g., three tilt positions, five tilt positions, nine tilt positions, and/or the like). For example, the object 102 may be capable of being positioned in five tilt positions with respect to each tilt direction.

As shown in FIGS. 1A and 1B, in some implementations, object 102 is capable of rotating about an axis of the object 102 (herein referred to as object axis 112). In some implementations, the object axis 112 is an axis that is substantially parallel to (i.e., aligned with) the z-direction when the object 102 is in an un-tilted position and that passes through the tilt point 104. In some implementations, the object 102 may be positioned in multiple rotational positions. For example, in some implementations, the object 102 may be positioned in 8, 16, 32, 44, or more rotational positions. In some implementations, the object 102 may be capable of 360 degree) (°) rotation. In some implementations, the object 102 may be in any rotational position while the object 102 is in any tilt position in any direction.

In some implementations, object 102 may be in one of multiple states, where each state is associated with a tilt position with respect to the first direction, a tilt position with respect to the second direction, and a rotational position. In some implementations, each possible state of the object 102 may be mapped to a corresponding set of magnetic field strengths in order to allow the state of object 102 to be determined based on sensing magnetic field components by the magnetic sensor 108, as described below.

The magnet 106 includes a magnet that is connected (e.g., attached, coupled, affixed, and/or the like) to object 102 such that a state of magnet 106 corresponds to a state of object 102, as described herein. In some implementations, the magnet 106 comprises a first half forming a north pole (N) and a second half forming a south pole(S), so that the magnet 106 comprises one pole pair. For example, as shown in FIGS. 1A and 1B, the magnet 106 may include a magnet with a north pole on a first half of the magnet 106 and a south pole on a second half of the magnet 106. As another example, the magnet 106 may include a magnet with a north pole on a first half of the magnet 106 that is stacked (e.g., along the z-direction) on a south pole on a second half of the magnet 106 (not shown). Additionally, or alternatively, the magnet 106 may include a dipole magnet (e.g., a dipole bar magnet, a circular dipole magnet, an elliptical dipole magnet, etc.), a permanent magnet, an electromagnet, a magnetic tape, and/or the like. In some implementations, the magnet 106 may, without limitation, comprise more than one pole pair.

In some implementations, the magnet 106 may be comprised of a ferromagnetic material (e.g., Hard Ferrite), and may produce a magnetic field. In some implementations, the magnet 106 may further comprise a rare earth magnet, which may be of advantage due to an intrinsically high magnetic field strength of rare earth magnets. In some implementations, the magnet 106 may be a homogeneously magnetized magnet with a residual induction (Br) in a range from 150 millitesla (mT) to approximately 1400 mT, such as 1000 mT.

In some implementations, a dimension of the magnet 106 (e.g., a length, a width, a height, a diameter, a radius, and/or the like) may be in a range from approximately 1 millimeter (mm) to approximately 15 mm, such as 3 mm. As a particular example, the magnet 106 may have a length, a width, and a height of approximately 3 mm (i.e., magnet 106 may be a 3 mm×3 mm×3 mm cube). Notably, while the magnet 106 is shown as having a square shape in FIGS. 1A and 1B, the magnet 106 may have another shape, such as a rectangular shape, a circular shape, an elliptical shape, a triangular shape, or a ring shape, among other examples.

In some implementations, the magnet 106 may be connected to the object 102 in an asymmetric manner. For example, as shown in both FIGS. 1A and 1B, the magnet 106 may be connected to the object 102 such that a center of the magnet 106 is at an offset from the object axis 112. In some implementations, the offset of the center of the magnet 106 from the object axis 112 may be in a range from, for example, approximately 0.2 mm to approximately 5.0 mm, such as 0.5 mm. As further shown in FIGS. 1A and 1B, the magnet 106 may be arranged such that the tilt point 104 is a particular axial distance from a closest surface of the magnet 106 (e.g., a top surface in FIG. 1A). In some implementations, the particular axial distance may be in a range from approximately 5 mm to approximately 30 mm. In some implementations, the asymmetric mounting of the magnet 106 (e.g., the arrangement of the magnet 106 at the offset and the axial distance) provides for magnetic state separation among states of the object 102 such that the state of object 102 may be reliably identified by the magnetic sensor 108, as described below.

The magnetic sensor 108 includes one or more apparatuses for sensing components of a magnetic field for use in determining a state of the object 102 (e.g., based on a state of the magnet 106 relative to the magnetic sensor 108). For example, as shown in FIGS. 1A and 1B, the magnetic sensor 108 may include a first 3D sensing pixel 110 and a second 3D sensing pixel 110. A 3D sensing pixel 110 comprises a circuit (e.g., one or more integrated circuits) that each operate to (separately) sense an x-component of a magnetic field, a y-component of the magnetic field, and a z-component of the magnetic field. The 3D sensing pixel 110 may be, for example, a 3D Hall pixel that is capable of sensing three magnetic field components based on the Hall effect. In some implementations, a distance between the first 3D sensing pixel 110 and the second 3D sensing pixel 110 may be in a range from, for example, approximately 1 mm to approximately 3 mm.

In some implementations, the first 3D sensing pixel 110 and the second 3D sensing pixel 110 form a differential 3D sensor. For example, the magnetic sensor 108 may include circuitry configured to combine a first signal corresponding to the x-component of the magnetic field as sensed by the first 3D sensing pixel 110 and a second signal corresponding to the x-component of the magnetic field as sensed by the second 3D sensing pixel 110 to generate a first combined signal. Here, the first combined signal may be representative of a difference between the first and second sensor signals associated with the x-component of the magnetic field. Similarly, the magnetic sensor 108 may include circuitry configured to combine a third signal corresponding to the y-component of the magnetic field as sensed by the first 3D sensing pixel 110 and a fourth signal corresponding to the y-component of the magnetic field as sensed by the second 3D sensing pixel 110 to generate a second combined signal. Here, the second combined signal may be representative of a difference between the third and fourth sensor signals associated with the y-component of the magnetic field. Further, the magnetic sensor 108 may include circuitry configured to combine a fifth signal corresponding to the z-component of the magnetic field as sensed by the first 3D sensing pixel 110 and a sixth signal corresponding to the z-component of the magnetic field as sensed by the second 3D sensing pixel 110 to generate a third combined signal. Here, the third combined signal may be representative of a difference between the fifth and sixth sensor signals associated with the z-component of the magnetic field. In some implementations, the 3D sensing pixels 110 can be electrically connected in a half-bridge configuration or in a full-bridge configuration (e.g., a Wheatstone bridge) to provide differential circuitry that may be used to generate such combined sensor signals. Additionally, or alternatively, the differential circuitry may one or more other components, such as a differential amplifier, an adder, a subtractor, a combiner, logic circuitry, and/or a processor (e.g., a processor that applies differential calculus) to differentially combine signals. In this way, the 3D sensing pixels 110 of the magnetic sensor 108 provide a robustness to (homogeneous) external stray magnetic fields and/or reduce or eliminate a need for calibration.

In some implementations, the magnetic sensor 108 may include an integrated circuit that includes an integrated controller (e.g., such that an output of the magnetic sensor 108 may include information that describes a state of the magnet 106 and/or a state of the object 102). Additional details regarding the magnetic sensor 108 are described below with regard to FIG. 3.

In some implementations, the magnetic sensor 108 may be arranged at a position relative to the magnet 106 such that the 3D sensing pixels 110 of the magnetic sensor 108 can detect the components of the magnetic field in an environment of the magnetic sensor 108 (e.g., including the magnetic field produced by the magnet 106). In some implementations, the magnetic sensor 108 is arranged such that the first 3D sensing pixel 110 and the second 3D sensing pixel 110 are at different distances from the tilt point 104 of the object 102. That is, the magnetic sensor 108 may in some implementations be arranged such that the magnetic sensor 108 is not centered on the object 102. Further, the magnetic sensor 108 may in some implementations be arranged such that the first 3D sensing pixel 110 and the second 3D sensing pixel 110 are at different distances from the center of the magnet 106. That is, the magnetic sensor 108 may in some implementations be arranged such that the magnetic sensor 108 is not centered on the magnet 106. In some implementations, such arrangement of the magnetic sensor 108 and, therefore, the 3D sensing pixels 110, enables differential measurement of the magnetic field as described above.

In some implementations, as illustrated in FIG. 1A, the magnetic sensor 108 is arranged such that the first 3D sensing pixel 110 and the second 3D sensing pixel 110 are aligned with a tilt axis of the object 102. Such an arrangement of the magnetic sensor 108 may be referred to as a longitudinal arrangement. In some implementations, arrangement of the magnetic sensor 108 in the longitudinal arrangement is of relatively low complexity and of relatively low cost.

Alternatively, as illustrated in FIG. 1B, the magnetic sensor 108 may in some implementations be arranged such that the first 3D sensing pixel 110 and the second 3D sensing pixel 110 are aligned with the object axis 112 when the object 102 is in an un-tilted position. Such an arrangement of the magnetic sensor 108 may be referred to as a perpendicular arrangement. In some implementations, arrangement of the magnetic sensor 108 in the perpendicular arrangement enables improved reliability through increased state separation (e.g., as described below with respect to FIG. 3).

Notably, in both the longitudinal arrangement and the perpendicular arrangement, the first 3D sensing pixel 110 and the second 3D sensing pixel 110 are at different distances from the tilt point 104 of the object 102. Further, both the first 3D sensing pixel 110 and the second 3D sensing pixel 110 are at different distances from the center of the magnet 106 (e.g., the 3D differential sensor formed by the first and second 3D sensing pixels 110 is not centered with respect to the center of the magnet 106). Therefore, both the longitudinal arrangement and the perpendicular arrangement enable differential measurement that provides robustness against stray fields and/or reduces or eliminates a need for calibration.

In some implementations, the magnetic sensor 108 may be configured with mapping information associated with determining the state of object 102 based on the sensed components of the magnetic field. The mapping information may include information associated with a state (e.g., information that identifies a tilt position, a linear position, and/or a rotational position corresponding to the state) and a set of magnetic field strengths, corresponding to the state, including a magnetic field strength in the x-direction, a magnetic field strength in the y-direction, and a magnetic field strength in the z-direction. The mapping information may include such information for multiple states. For example, using the example described above, the mapping information may include information associated with a plurality of possible states of the object 102 and a plurality of sets of magnetic field strengths, each corresponding to a different one of the plurality of possible states. In some implementations, the magnetic sensor 108 may be configured with the mapping information during a manufacturing process associated with the sensor system 100, a calibration process associated with the sensor system 100, a setup process associated with the sensor system 100, and/or the like.

During operation, the 3D sensing pixels 110 of the magnetic sensor 108 may each (separately) sense the x-component of the magnetic field in the environment of the magnetic sensor 108, the y-component of the magnetic field in the environment of the magnetic sensor 108, and the z-component of the magnetic field in the environment of the magnetic sensor 108. The magnetic field may include the magnetic field produced by the magnet 106, as well as one or more external magnetic fields (e.g., one or more stray magnetic fields, one or more magnetic fields generated by an electrical component near the magnetic sensor 108, or the like). The magnetic sensor 108 may then generate a set of differential signals, where each differential signal is associated with a sub-component of the magnetic field. For example, the magnetic sensor 108 may generate a differential x-component signal based on the x-component of the magnetic field as sensed by the first 3D sensing pixel 110 and the second 3D sensing pixel 110, a differential y-component signal based on the y-component of the magnetic sensor 108 as sensed by the first 3D sensing pixel 110 and the second 3D sensing pixel 110, and a differential z-component signal based on the z-component of the magnetic sensor 108 as sensed by the first 3D sensing pixel 110 and the second 3D sensing pixel 110. In some implementations, the magnetic sensor 108 may output the set of differential signals to, for example, a controller (not shown). Additionally, or alternatively, the magnetic sensor 108 may compare the set of differential signals to mapping information (if configured on the magnetic sensor 108), and determine the state of object 102 based on the comparison. For example, the magnetic sensor 108 may identify a set of signal levels, included in the mapping information, that match (e.g., within a threshold) the signal levels as generated by the magnetic sensor 108. In this example, the magnetic sensor 108 may determine the state of object 102 as the state corresponding to the matched mapping information.

The number and arrangement of apparatuses shown in FIGS. 1A and 1B are provided as an example. In practice, there may be additional apparatuses, fewer apparatuses, different apparatuses, or differently arranged apparatuses than those shown in FIGS. 1A and 1B. Furthermore, two or more apparatuses shown in FIGS. 1A and 1B may be implemented within a single apparatus, or a single apparatus shown in FIGS. 1A and 1B may be implemented as multiple, distributed apparatuses. Additionally, or alternatively, a set of apparatuses (e.g., one or more apparatuses) of the sensor system 100 may perform one or more functions described as being performed by another set of apparatuses of the sensor system 100.

Figure 2:
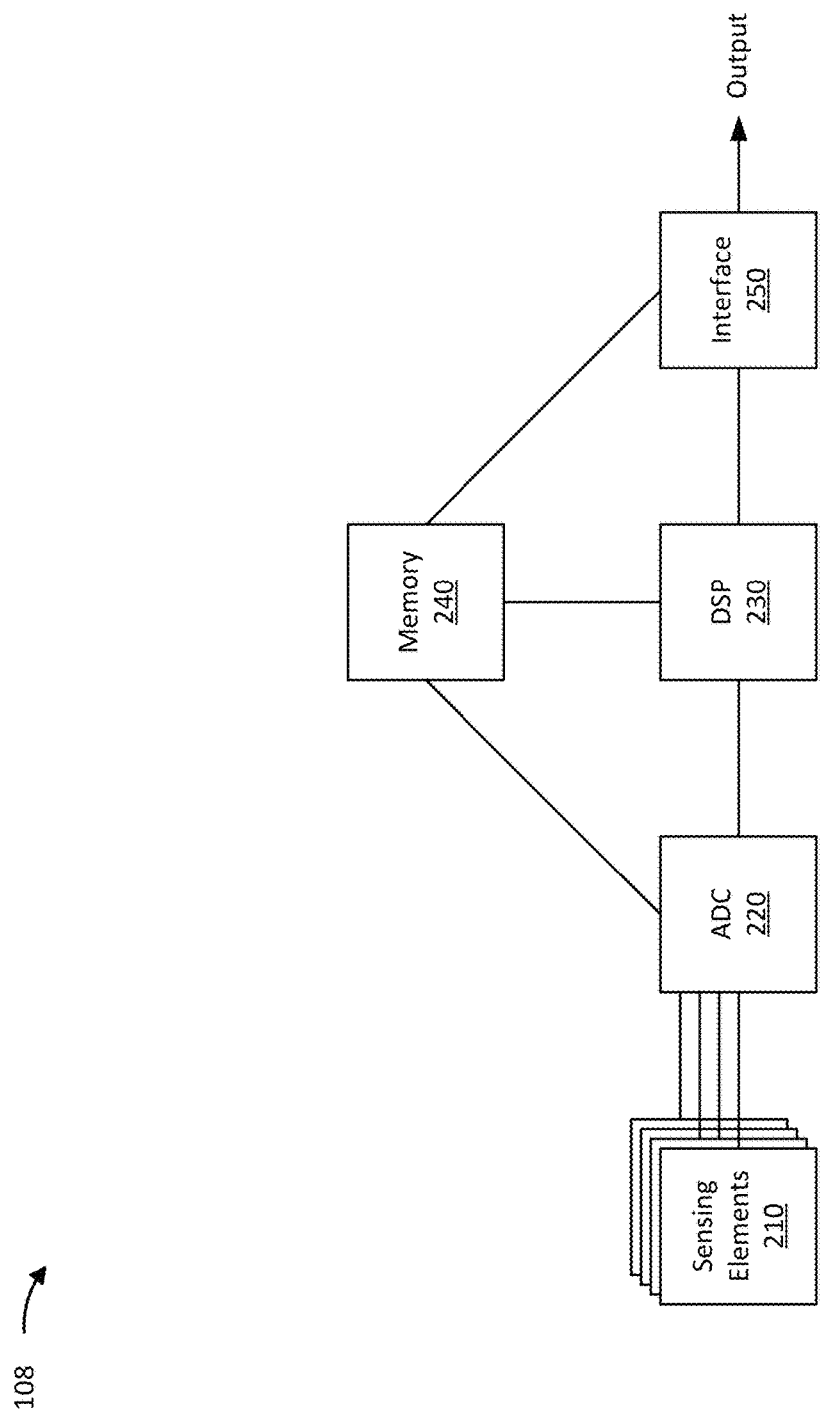
FIG. 2 is a diagram of an example magnetic sensor according to one or more implementations described herein.

FIG. 2 is a diagram of an example magnetic sensor 108 according to one or more implementations described herein. As shown in FIG. 2, the magnetic sensor 108 may include a plurality of sensing elements 210, an analog-to-digital convertor (ADC) 220, a digital signal processor (DSP) 230, a memory element 240, and an interface 250.

The magnetic sensor 108 may include a semiconductor chip (e.g., a sensor chip) that includes the plurality of sensing elements 210 that measure or otherwise sense one or more characteristics of a magnetic field (e.g., an amount of magnetic field flux density, a field strength, a field angle, a field direction, a field orientation, etc.) and provide one or more sensor signals corresponding to the sensed characteristics of the magnetic field. For example, a sensing element 210 may be configured to generate a sensor signal (e.g., a voltage) in response to one or more magnetic fields impinging on the sensing element 210. Thus, the sensor signal is indicative of a magnitude and/or a field orientation of at least one magnetic field impinging on the sensing element 210. The semiconductor chip may further include sensor circuitry for processing and outputting one or more sensor signals generated by the one or more sensing elements 210. In some implementations, the plurality of sensing elements 210 may be distributed on two or more semiconductor chips.

The magnetic field may be produced by a magnet, a current-carrying conductor (e.g., a wire, a lead frame, or a busbar), the Earth, or another magnetic field source. A given sensing element 210 has a "sensitivity axis" or "sensing axis." The sensing element 210 is sensitive to a component of a magnetic field that is projected onto or aligned with the sensitivity axis. Moreover, a sensing element 210 is substantially insensitive to magnetic field components of a magnetic field that are not projected onto or aligned with the sensitivity axis. A magnetic field component may be, for example, an x-component of a magnetic field (Bx), a y-component of a magnetic field (By), or a z-component of a magnetic field (Bz). In the examples described herein, the x-component of the magnetic field and the y-component of the magnetic field are aligned in-plane to the semiconductor chip, and the z-component of the magnetic field is aligned out-of-plane to the semiconductor chip. Accordingly, the x-component of the magnetic field and the y-component of the magnetic field may be referred to as "in-plane" magnetic field components that are aligned parallel to a chip plane (e.g., a chip surface) of the semiconductor chip. In contrast, the z-component of the magnetic field may be referred to as an "out-of-plane" magnetic field component that extends out of the chip plane (e.g., a chip surface) of the semiconductor chip. For example, the z-component of the magnetic field extends perpendicular to the chip plane.

In some implementations, the magnetic sensor 108 includes a group of sensing elements 210 that are sensitive in different directions. For example, the magnetic sensor 108 may include a first sensing element 210 configured to sense a first magnetic field component (e.g., the x-component of the magnetic field), a second sensing element configured to sense a second magnetic field component (e.g., the y-component of the magnetic field), and a third sensing element configured to sense a third magnetic field component (e.g., the z-component of the magnetic field). In some implementations, such a group of sensing elements 210 may form a 3D sensing pixel 110 pixel as described herein. In some implementations, the magnetic sensor 108 includes multiple such groups of sensing elements 210. Thus, the magnetic sensor 108 may in some implementations include multiple groups of sensing elements 210, each of which forms a 3D sensing pixel 110. In some implementations, the groups of sensing elements 210 (i.e., the plurality of 3D sensing pixels 110) form a differential 3D sensor, as described herein.

In some implementations, the sensing elements 210 may include one or more Hall-based sensing elements (i.e., Hall sensing elements). A Hall sensing element is a transducer that varies an output voltage (e.g., a Hall voltage) in response to a magnetic field. The Hall sensing element may be, for example, a Hall plate through which a current is conducted. The output voltage of the Hall sensing element is based on a Hall effect which makes use of a Lorentz force. The Lorentz force deflects moving charges in a presence of the magnetic field, which is perpendicular to a current flow through the Hall sensing element (e.g., a Hall plate). Thereby, the sensing element can be a thin piece of semiconductor material or metal. The deflection causes a charge separation, which causes a Hall electrical field. This Hall electrical field acts on the charge in an opposite direction to the Lorentz force. Both forces balance each other and create a potential difference perpendicular to a direction of current flow. The potential difference can be measured as the Hall voltage and varies in a linear relationship with the magnetic field.

There are generally two types of Hall sensing elements, including vertical Hall sensing elements and lateral Hall sensing elements. A vertical Hall sensing element (e.g., a vertical Hall plate) is constructed perpendicular to the chip plane defined by the main surface of the semiconductor chip. In particular, the vertical Hall sensing element may be a conductive plate having a sensor plane that extends "vertically" from the main surface of the semiconductor chip into a chip body of the semiconductor chip. The sensitivity axis of the vertical Hall sensing element is perpendicular to the sensor plane. This generally means that the vertical Hall sensing element is sensitive to the magnetic field component that extends parallel to, or in-plane with, the main surface of the semiconductor chip in which the vertical Hall sensing element is integrated. For the vertical Hall sensing element, a voltage value may be output according to a magnetic field flux density in the direction of its sensitivity axis.

On the other hand, a lateral (planar) Hall sensing element (e.g., a lateral Hall plate) is constructed with a sensor plane that is parallel to the chip plane defined by the main surface of the semiconductor chip. In particular, the lateral Hall sensing element may be a conductive plate having a sensor plane that extends laterally along or parallel to the main surface of the semiconductor chip. Since the sensitivity axis of the lateral Hall sensing element is perpendicular to the sensor plane, this generally means that the lateral Hall sensing element is sensitive to magnetic fields vertical, or out-of-plane, to the main surface of the semiconductor chip. For the lateral Hall sensing element, a voltage value may be output according to the magnetic field flux density in the direction of its sensitivity axis.

Accordingly, vertical Hall sensing elements may be used to measure magnetic fields parallel to the chip plane of the magnetic sensor 108, and lateral Hall sensing elements may be used to measure magnetic fields perpendicular to the chip plane of the magnetic sensor 108. Two or more sensing elements and corresponding sensor circuitry may be accommodated (e.g., integrated) in a same semiconductor chip. The sensor circuitry may be referred to as signal processing circuitry and/or signal conditioning circuitry that receives one or more signals (e.g., sensor signals) from one or more sensing elements in the form of raw measurement data, and derives, from the one or more signals, a measurement signal that represents the magnetic field. For example, the sensor circuitry may be configured to condition and amplify the sensor signal of one or more sensing elements 210 via signal processing and/or conditioning.

The above-described examples of sensing elements 210 are provided for illustrative purposes and, in practice, the sensing elements 210 may include any type of magnetic field sensing element capable of sensing a characteristic of a magnetic field and enabling a sensor signal to be provided to sensor circuitry. For example, the plurality of sensing elements 210 may in some implementations include one or more magnetoresistive-based sensing elements.

The ADC 220 may include an analog-to-digital converter that converts an analog signal from one or more sensing elements 210 to a digital signal. For example, the ADC 220 may convert analog signals, received from the plurality of sensing elements 210, into digital signals (e.g., digital samples) to be processed by DSP 230. The ADC 220 may provide the digital signals to DSP 230. In some implementations, magnetic sensor 108 may include one or more ADCs 220. For example, different ADCs 220 may be configured to receive analog signals from different sets of sensing elements 210 in the plurality of sensing elements 210.

The DSP 230 may include a digital signal processing device or a collection of digital signal processing devices. In some implementations, the DSP 230 may receive digital signals from the ADC 220 and may process the digital signals to form output signals (e.g., destined for a controller), such as an output signal that conveys sensor data, as described elsewhere herein. In some implementations, the output signals may be referred to as measurement signals.

The memory element 240 may include a read-only memory (ROM) (e.g., an EEPROM), a random-access memory (RAM), and/or another type of dynamic or static storage device (e.g., a flash memory, a magnetic memory, an optical memory, etc.) that stores information and/or instructions for use by magnetic sensor 108. In some implementations, the memory element 240 may store information associated with processing performed by DSP 230. Additionally, or alternatively, the memory element 240 may store configurational values or parameters for the one or more sensing elements 210 and/or information for one or more other components of magnetic sensor 108, such as the ADC 220 or the interface 250.

The interface 250 may include an interface via which magnetic sensor 108 may receive and/or provide information from and/or to another device in a system, such as a controller (not shown). For example, the interface 250 may provide the output signal, determined or otherwise generated by DSP 230, to the controller, and may further receive information from the controller. In some implementations, the interface 250 may be a communication interface that receives the output signals from the DSP 230 and provides the output signals as communication signals according to a communication protocol, which may include transmitting the output signals as the communication signals or generating the communication signals based on the output signals.

As indicated above, FIG. 2 is provided as an example. Other examples may differ from what is described with regard to FIG. 2. The number and arrangement of components shown in FIG. 2 are provided as an example. In practice, the magnetic sensor 108 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the magnetic sensor 108 may perform one or more functions described as being performed by another set of components of the magnetic sensor 108.

Figure 3:
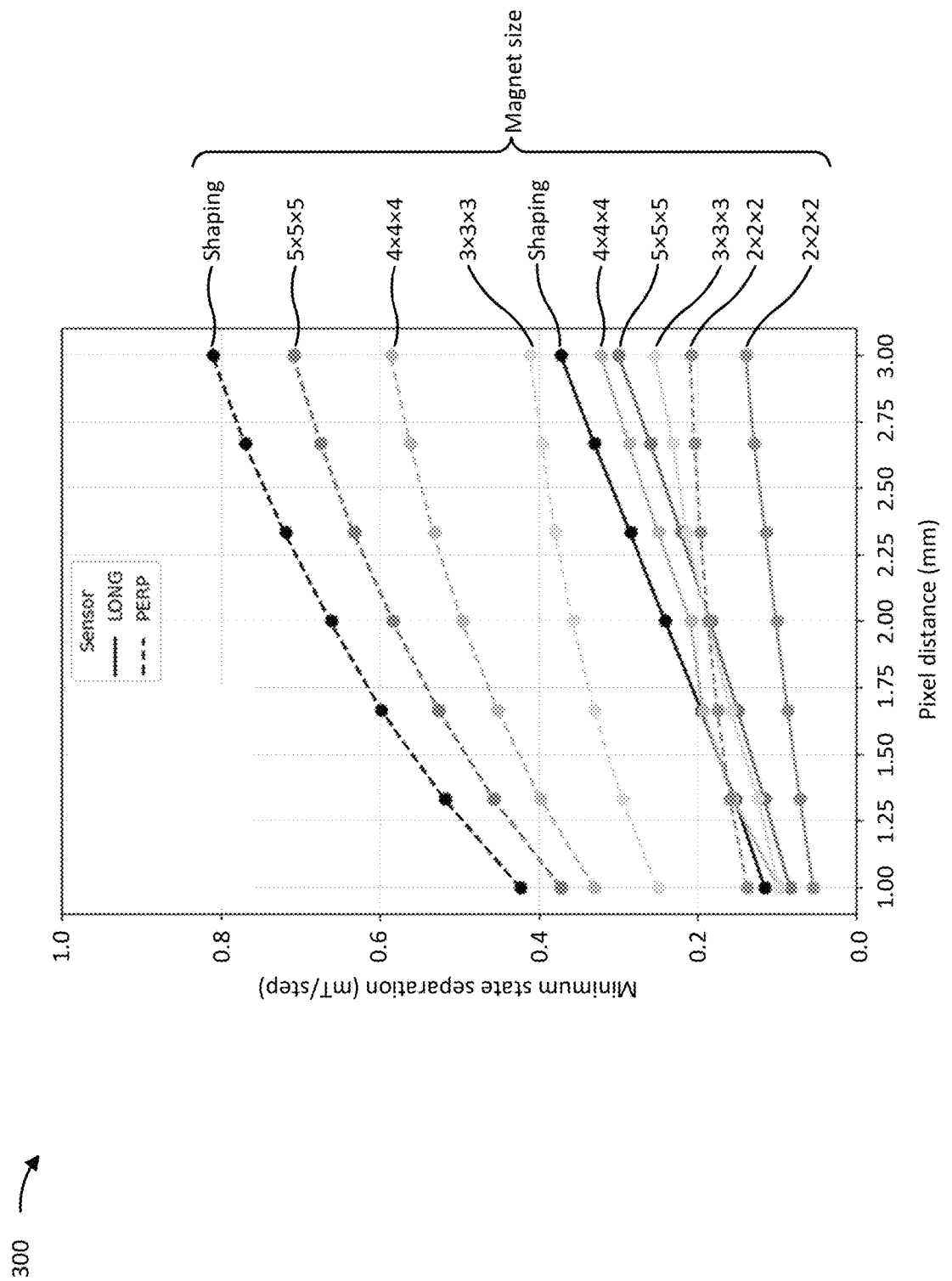
FIG. 3 is a diagram illustrating examples associated with measurement resolution achievable by the sensor system described herein.

FIG. 3 is a diagram 300 illustrating examples associated with measurement resolution achievable by the sensor system 100 described herein. The horizontal axis in FIG. 3 represents a distance between 3D sensing pixels 110 of the magnetic sensor 108 (in mm). The vertical axis in FIG. 3 represents magnetic state separation (in mT/step).

In some implementations, as noted above, each possible state of the object 102 (e.g., any of a plurality of rotational positions at any tilt position) can be represented by a different point in a 3D magnetic space, where each point is defined by a differential magnetic field strength in the x-direction, a differential magnetic field strength in the y-direction, and a differential magnetic field strength in the z-direction. Thus, each state of the object 102 may correspond to a different set of magnetic field strengths. FIG. 3 illustrates a minimum separation in mT per step (mT/step) for a variety of sizes of the magnet 106 (e.g., an application-specific shaped magnet (shaping), 2 mm×2 mm×2 mm, 3 mm×3 mm×3 mm, 4 mm×4 mm×4 mm, 5 mm×5 mm×5 mm) and a variety of distances between the 3D sensing pixels 110 (e.g., from 1 mm to 3 mm) for both the longitudinal arrangement of the magnetic sensor 108 (represented by solid lines) and the perpendicular arrangement of the magnetic sensor 108 (represented by dashed lines).

As one example, as illustrated in FIG. 3, for a 5 mm×5 mm×5 mm magnet 106 and a magnetic sensor 108, a 3D sensing pixel 110 distance of 2 mm, and the magnetic sensor 108 in the perpendicular arrangement, the sensor system 100 achieves a minimum state separation of approximately 0.57 mT/step. In one particular example, a magnetic sensor 108 may be capable of 0.0325 mT per least significant bit (mT/LSB). Such a magnetic sensor 108 can achieve a resolution of less than approximately 0.1° for tilt measurement (e.g., for a tilt step of 1°, (0.57 mT/step)/(0.0325 mT/LSB)=17.5 LSB/step; (1°/step)/(17.5 LSB/step)=0.06°/LSB) and a resolution of less than approximately 0.3° for rotational position measurement over 360° (e.g., for a rotational step of 5°, (0.57 mT/step)/(0.0325 mT/LSB)=17.5 LSB/step; (5°/step)/(17.5 LSB/step)=0.29°/LSB). As another particular example, a magnetic sensor 108 may be capable of 0.0082 mT/LSB. Such a magnetic sensor 108 can achieve a resolution of less than approximately 0.02° for tilt measurement (e.g., for a tilt step of 1°, (0.57 mT/step)/(0.0082 mT/LSB)=69.5 LSB/step; (1°/step)/(69.5 LSB/step)=0.014°/LSB) and a resolution of less than approximately 0.1° for rotational position measurement over 360° (e.g., for a rotational step of 5°, (0.57 mT/step)/(0.0082 mT/LSB)=69.5 LSB/step; (5°/step)/(69.5 LSB/step)=0.07°/LSB).

As another example, as illustrated in FIG. 3, for a 5 mm×5 mm×5 mm magnet 106 and a magnetic sensor 108, a 3D sensing pixel 110 distance of 2 mm, and the magnetic sensor 108 in the longitudinal arrangement, the sensor system 100 achieves a state separation of approximately 0.17 mT/step. In one particular example, a magnetic sensor 108 may be capable of 0.0325 mT/LSB). Such a magnetic sensor 108 can achieve a resolution of less than approximately 0.2° for tilt measurement (e.g., for a tilt step of 1°, (0.18 mT/step)/(0.0325 mT/LSB)=5.5 LSB/step; (1°/step)/(5.5 LSB/step)=0.18°/LSB) and a resolution of approximately 1.0° for rotational position measurement over 360° (e.g., for a rotational step of 5°. (0.18 mT/step)/(0.0325 mT/LSB)=5.5 LSB/step; (5°/step)/(5.5 LSB/step)=0.91°/LSB). As another particular example, a magnetic sensor 108 may be capable of 0.0082 mT/LSB. Such a magnetic sensor 108 can achieve a resolution of less than approximately 0.5° for tilt measurement (e.g., for a tilt step of 1°, (0.18 mT/step)/(0.0082 mT/LSB)=22.0 LSB/step; (1°/step)/(22.0 LSB/step)=0.045°/LSB) and a resolution of less than approximately 0.25° for rotational position measurement over 360° (e.g., for a rotational step of 5°, (0.18 mT/step)/(0.0082 mT/LSB)=22.0 LSB/step; (5°/step)/(22.0 LSB/step)=0.23°/LSB). Notably, a sensor system 100 in which the object 102 is configured to rotate with less than 360° rotation would have improved resolution with respect to rotational position measurement (e.g., due to the number of possible rotational positions being reduced as compared to an object 102 configured for 360° rotation). In this way, the sensor system 100 may achieve sufficient magnetic state separation to allow for reliable determination of the state of object 102.

As illustrated by FIG. 3, the sensor system 100 is capable of achieving sufficient magnetic state separation to allow for reliable determination of the state of object 102.

As indicated above, FIG. 3 is provided as an example. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A sensor system, comprising:
   an object configured to tilt about a tilt point in multiple directions, the object having an un-tilted axis corresponding to an un-tilted position of the object, wherein the un-tilted axis extends through the tilt point;
   a magnet connected to the object, the magnet being connected to the object such that a center of the magnet is offset from the un-tilted axis of the object by a first axial distance, wherein the un-tilted axis extends through the magnet; and
   a magnetic sensor comprising a first three-dimensional (3D) sensing pixel and a second 3D sensing pixel,
      wherein the magnetic sensor is arranged such that the first 3D sensing pixel and the second 3D sensing pixel are at different distances from the tilt point of the object, and
      wherein the magnetic sensor is arranged such that the first 3D sensing pixel and the second 3D sensing pixel are at different distances from the center of the magnet.

2. The sensor system of claim 1, wherein the magnetic sensor is arranged such that the first 3D sensing pixel and the second 3D sensing pixel are aligned with a tilt direction of the object.

3. The sensor system of claim 1, wherein the magnetic sensor is arranged such that the first 3D sensing pixel and the second 3D sensing pixel are aligned with the un-tilted axis of the object.

4. The sensor system of claim 1, wherein the first 3D sensing pixel and the second 3D sensing pixel form a differential 3D sensor.

5. The sensor system of claim 1, wherein a distance between the first 3D sensing pixel and the second 3D sensing pixel is in a range from approximately 1 millimeter (mm) to approximately 3 mm.

6. The sensor system of claim 1, wherein the sensor system is included in a joystick.

7. The sensor system of claim 1, wherein the sensor system is included in a device capable of three degrees of freedom (3-DoF) motion.

8. The sensor system of claim 1, wherein the magnetic sensor is arranged such that the first 3D sensing pixel and the second 3D sensing pixel are at different axial distances from the un-tilted axis.

9. The sensor system of claim 8, wherein the first 3D sensing pixel is arranged at a second axial distance from the un-tilted axis and the second 3D sensing pixel is arranged at a third axial distance from the un-tilted axis, and wherein the first axial distance, the second axial distance, and the third axial distance are different axial distances along an axis that extends perpendicular to the un-tilted axis.

10. The sensor system of claim 1, wherein the object has a tilted axis, corresponding to a tilted position of the object, that deviates from the un-tilted axis.

11. The sensor system of claim 1, wherein the first axial distance extends in a direction that is perpendicular to the un-tilted axis.

12. The sensor system of claim 1, wherein the magnet has a center axis that extends parallel to the un-tilted axis, and wherein the first axial distance is a distance between the center axis and the un-tilted axis in a direction that is perpendicular to the un-tilted axis.

13. The sensor system of claim 1, wherein the first 3D sensing pixel and the second 3D sensing pixel are arranged in a same direction relative to the un-tilted axis and are aligned with different tilt angles of the object.

14. A sensor system, comprising:
   a magnet connected to an object, the magnet being connected to the object such that the magnet is not centered on an un-tilted axis of the object,
      wherein the object is configured to tilt about a tilt point, and
      wherein the un-tilted axis extends through the tilt point and corresponds to an un-tilted position of the object; and
   a differential three-dimensional (3D) sensor,
      wherein a first 3D sensing pixel of the differential 3D sensor and a second 3D sensing pixel of the differential 3D sensor are at different distances from the tilt point of the object, and
      wherein the differential 3D sensor is not centered with respect to a center of the magnet.

15. The sensor system of claim 14, wherein the differential 3D sensor is arranged such that each 3D sensing pixel of the differential 3D sensor is aligned with a tilt direction of the object.

16. The sensor system of claim 14, wherein the differential 3D sensor is arranged such that each 3D sensing pixel of the differential 3D sensor is aligned with the un-tilted axis of the object when the object is in an un-tilted position.

17. The sensor system of claim 14, wherein a distance between a pair of 3D sensing pixels of the differential 3D sensor is in a range from approximately 1 millimeter (mm) to approximately 3 mm.

18. The sensor system of claim 14, wherein the sensor system is included in a joystick.

19. The sensor system of claim 14, wherein the sensor system is included in a device capable of three degrees of freedom (3-DoF) motion.

20. An apparatus, comprising:
   a magnet connected to an object capable of being positioned with respect to multiple degrees of freedom,
      wherein the object is configured to tilt about a tilt point,
      wherein the object has an un-tilted axis corresponding to an un-tilted position of the object,
      wherein the un-tilted axis extends through the tilt point, and
      wherein the magnet is connected to the object such that a center of the magnet is offset from the un-tilted axis of the object; and
   a magnetic sensor to determine a state of the object with respect to the multiple degrees of freedom based on a set of magnetic field strengths of a magnetic field generated by the magnet, the magnetic sensor comprising a first three-dimensional (3D) sensing pixel and a second 3D sensing pixel,
  wherein a distance between the first 3D sensing pixel and the tilt point of the object is different from a distance between the second 3D sensing pixel and the tilt point of the object, and
  wherein a distance between the first 3D sensing pixel and the center of the magnet is different from a distance between the second 3D sensing pixel and the center of the magnet.

21. The apparatus of claim 20, wherein the first 3D sensing pixel and the second 3D sensing pixel are aligned with a tilt direction of the object.

22. The apparatus of claim 20, wherein the first 3D sensing pixel and the second 3D sensing pixel are aligned with the un-tilted axis of the object when the object is in an un-tilted position.

23. The apparatus of claim 20, wherein the first 3D sensing pixel and the second 3D sensing pixel cause the magnetic sensor to determine a differential measurement based on the set of magnetic field strengths.

24. The apparatus of claim 20, wherein a distance between the first 3D sensing pixel and the second 3D sensing pixel is in a range from approximately 1 millimeter (mm) to approximately 3 mm.

25. The apparatus of claim 20, wherein the apparatus is a joystick.

26. The apparatus of claim 20, wherein the apparatus is a device capable of three degrees of freedom (3-DoF) motion.

* * * * *